US012314506B2

(12) United States Patent
Kim et al.

(10) Patent No.: US 12,314,506 B2
(45) Date of Patent: May 27, 2025

(54) PRESSURE SENSOR MODULE COMPRISING AT LEAST ONE SENSING ELECTRODE FACING CONDUCTIVE RESISTOR AND APPARATUS AND METHOD FOR CONTROLLING THE PRESSURE SENSOR MODULE

(71) Applicant: KOREA ELECTRONICS TECHNOLOGY INSTITUTE, Seongnam-si (KR)

(72) Inventors: Won Hyo Kim, Yongin-si (KR); Woo Kyeong Seong, Seongnam-si (KR); Kook Nyung Lee, Seoul (KR); Su Mi Yoon, Anyang-si (KR); Dong Ki Hong, Pyeongtaek-si (KR); Young Joo Kim, Seoul (KR); Hye Lim Kang, Chungcheongbuk-do (KR)

(73) Assignee: Korea Electronics Technology Institute, Seongnam-si (KR)

( * ) Notice: Subject to any disclaimer, the term of this patent is extended or adjusted under 35 U.S.C. 154(b) by 272 days.

(21) Appl. No.: 18/049,991

(22) Filed: Oct. 26, 2022

(65) Prior Publication Data
US 2023/0073404 A1 Mar. 9, 2023

Related U.S. Application Data

(63) Continuation of application No. PCT/KR2021/002829, filed on Mar. 8, 2021.

(30) Foreign Application Priority Data

Apr. 28, 2020 (KR) .................. 10-2020-0051654

(51) Int. Cl.
*G06F 3/041* (2006.01)
*G01L 1/00* (2006.01)

(52) U.S. Cl.
CPC ............ *G06F 3/04144* (2019.05); *G01L 1/00* (2013.01); *G06F 3/0412* (2013.01); *G06F 2203/04102* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 9,766,742 B2 * 9/2017 Papakostas ............. G06F 3/045
2011/0279401 A1 * 11/2011 Hong .................... G06F 3/0446
29/846
(Continued)

FOREIGN PATENT DOCUMENTS

| JP | 3707363 B2 | 10/2005 |
| JP | 4638474 B2 | 2/2011 |
| JP | 6539204 82 | 7/2019 |
| KR | 10-2011-0125970 A | 11/2011 |

(Continued)

OTHER PUBLICATIONS

International Search Report mailed Jul. 6, 2021 in International Application No. PCT/KR2021/02829.

*Primary Examiner* — Andre J Allen
(74) *Attorney, Agent, or Firm* — Knobbe, Martens, Olson & Bear, LLP

(57) ABSTRACT

A pressure sensor is proposed. The pressure sensor may include a base substrate, and at least one sensing electrode formed on the base substrate. The pressure sensor may also include an electrode wire electrically connected to one side of the sensing electrode, extending on the base substrate, and formed at one side of a power connection part. The pressure sensor may further include an insulative adhesive layer coated on a region of the base substrate other than a region on which the sensing electrode is formed. The pressure sensor may further include a resistant substrate which is stacked on and coupled to the base substrate by the adhesive layer and on one surface of which a resistor is formed to be spaced apart from and face the sensing electrode in a stacking direction. According to embodiments, it is possible to effectively achieve flexible response of a pressure sensor for external pressure.

10 Claims, 14 Drawing Sheets

(58) Field of Classification Search
CPC ............ G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 11/008; G01L 13/026; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 7/06; G01L 1/2206; G01L 5/228; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/166; G01L 7/185; G01L 1/255; G01L 21/08; G01L 5/0057; G01L 5/1627; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................. 73/700–756
See application file for complete search history.

(56) References Cited

U.S. PATENT DOCUMENTS

2016/0327441 A1* 11/2016 Iwase ................ G01L 1/205
2022/0136914 A1*  5/2022 Kim ................... G01L 1/205
                                                          338/47

FOREIGN PATENT DOCUMENTS

| KR | 10-1178791 B1 | 8/2012 |
| KR | 10-2012-101312 A | 9/2012 |
| KR | 20180117893 A * | 10/2018 |

* cited by examiner

PRESSURE SENSOR MODULE COMPRISING AT LEAST ONE SENSING ELECTRODE FACING CONDUCTIVE RESISTOR AND APPARATUS AND METHOD FOR CONTROLLING THE PRESSURE SENSOR MODULE

CROSS REFERENCE TO RELATED APPLICATIONS

This is a continuation application of International Patent Application No. PCT/KR2021/002829, filed on Mar. 8, 2021, which claims priority to Korean Patent Application No. 10-2020-0051654 filed on Apr. 28, 2020, contents of both of which are incorporated herein by reference in their entireties.

BACKGROUND

Technical Field

Exemplary embodiments of the present disclosure relate to a pressure sensor module and a control method therefor.

Description of Related Technology

Generally, pressure sensors are coupled to a typical base plate or substrate in the form of a thin film when viewed in a plan view and, as such, may respond to shrinkage and expansion of the substrate according to deformation, thereby sensing a degree of bending or deformation of the substrate.

SUMMARY

One aspect is a pressure sensor module capable of more flexibly coping with external pressure through a pressure sensor employing a flexible base substrate, thereby more effectively enhancing reliability of pressure sensing.

Another aspect is a pressure sensor module in which electrodes for pressure sensing are disposed on a flexible base substrate while intersecting each other, and electrode wirings are connected to the electrodes in one direction and the other direction, respectively, thereby being capable of not only achieving sensing of external pressure, but also sensing a position where the external pressure is applied.

Another aspect is a control method for a pressure sensor module capable of enabling pressure sensing through a pressure sensor module and heating to be simultaneously performed or achieving control of heating according to pressure sensing.

Another aspect is a pressure sensor module including a base substrate, at least one sensing electrode formed at the base substrate, the sensing electrode including a first sensing electrode and a second sensing electrode spaced apart from each other to be insulated from each other, a first electrode wiring electrically connected to one side of the first sensing electrode and formed at one surface of a power connector while extending on and along the base substrate, a second electrode wiring electrically connected to one side of the second sensing electrode and formed at the one surface of the power connector while extending on and along the base substrate, an insulating adhesive layer coated on a region of the base substrate other than a region of the base substrate where the sensing electrode is formed, and a resistor substrate stacked on the base substrate, coupled to the base substrate by the adhesive layer, and formed with a conductive resistor at one surface thereof such that the conductive resistor faces the sensing electrode while being spaced apart from each other in a stacking direction.

In this case, the at least one sensing electrode may include a plurality of sensing electrodes spaced apart from one another in one direction and another direction intersecting the one direction. The first electrode wiring may electrically interconnect the first sensing electrodes of the plurality of sensing electrodes in the one direction, and may extend to the power connector. The second electrode wiring may electrically interconnect the second sensing electrodes of the plurality of sensing electrodes in the other direction, and may extend to the power connector.

In addition, the first electrode wiring may be connected to an upper surface of the base substrate, and may extend to an upper surface of the power connector. The second electrode wiring may be formed at a lower surface of the base substrate while being electrically connected to the second sensing electrodes through via holes of the base substrate filled with a conductive filler, and may extend to a lower surface of the power connector.

In addition, the first electrode wiring may extend on and along an upper surface of the base substrate, to electrically connect the first sensing electrodes to an upper surface of the power connector. The second electrode wiring may extend to a lower surface of the base substrate while being electrically connected to the second sensing electrodes through via holes of the base substrate filled with a conductive filler, and may be electrically connected to the upper surface of the power connector through a via hole filled with a conductive filler at one end of the base substrate while extending to the upper surface of the base substrate in a state of being insulated from the first electrode wiring.

In addition, the first sensing electrode and the second sensing electrode may be formed to be spaced apart from each other, for insulation therebetween. The resistor may be formed in a space defined between the first sensing electrode and the second sensing electrode while facing the first sensing electrode and the second sensing electrode such that the resistor is selectively brought into contact with the first sensing electrode and the second sensing electrode.

In addition, the first sensing electrode may include a plurality of first linear electrodes formed to protrude in one direction while being spaced apart from one another. The second sensing electrode may face the first sensing electrode, and may include a plurality of second linear electrodes formed to protrude in spaces among the first linear electrodes while being spaced apart from the first linear electrodes, for insulation thereof from the first linear electrodes, respectively. The resistor may include at least one resistor pattern configured to electrically interconnect gaps between the first linear electrodes and the second linear electrodes, thereby electrically interconnecting the first sensing electrode and the second sensing electrode.

In addition, the pressure sensor module may further include a heater unit formed on another surface of the resistor substrate. The heater unit may include a substrate, and a heater pattern formed on the substrate.

In addition, the pressure sensor module may further include a bump protruding upwards and coupled to another surface of the resistor substrate opposite to a position corresponding to the resistor formed at the one surface of the resistor substrate.

Features and advantages of the present disclosure will be more apparent from the following detailed description given with reference to the accompanying drawings.

Prior to the description, it should be understood that the terms used in the specification and appended claims should not be construed as limited to general and dictionary meanings, but interpreted based on the meanings and concepts corresponding to technical aspects of the present disclosure on the basis of the principle that the inventor is allowed to define terms appropriately for best explanation.

In accordance with an exemplary embodiment of the present disclosure, there is an effect of enabling the pressure sensor to flexibly cope with external pressure applied thereto, and effectively securing reliability and durability of pressure sensing in accordance with application of a base substrate material of a flexible printed circuit board to the pressure sensor.

In addition, there is an effect of effectively sensing coordinates (a position) on a plane, to which pressure is applied, simultaneously with sensing of the pressure, by forming the sensing electrodes on the base substrate of the pressure sensor in one direction and the other direction intersecting each other, and electrically connecting the electrode wirings to the sensing electrodes in directions intersecting each other, respectively.

In addition, the bump protruding upwards is additionally formed at an outside of the pressure sensor at a position corresponding to a position at which the sensing electrode and the resistor face each other. Accordingly, external pressure is effectively transmitted to the sensing electrode and the resistor, for contact deformation of the sensing electrode and the resistor. Thus, there is an effect of further enhancing accuracy and sensitivity of pressure sensing.

In addition, in formation of the electrode wirings of the sensing electrode of the base substrate, the electrode wirings are disposed on the upper surface and the lower surface of the base substrate such that the electrode wirings are insulated from each other. Accordingly, there are effects of not only preventing electrical short circuit between the wirings, but also determining a position to which pressure is applied upon pressure sensing by electrodes intersecting each other.

In addition, since the heater unit is further formed at the pressure sensor, there is an effect of more effectively using a heater function for the user in accordance with a device requiring pressure sensing.

Furthermore, when the pressure sensor is used in a seat of a vehicle or a chair, there is an effect of effectively preforming a heater function meeting user convenience by operating the heater unit when pressure of the user is sensed by the pressure sensor.

DETAILED DESCRIPTION

Figure 1:
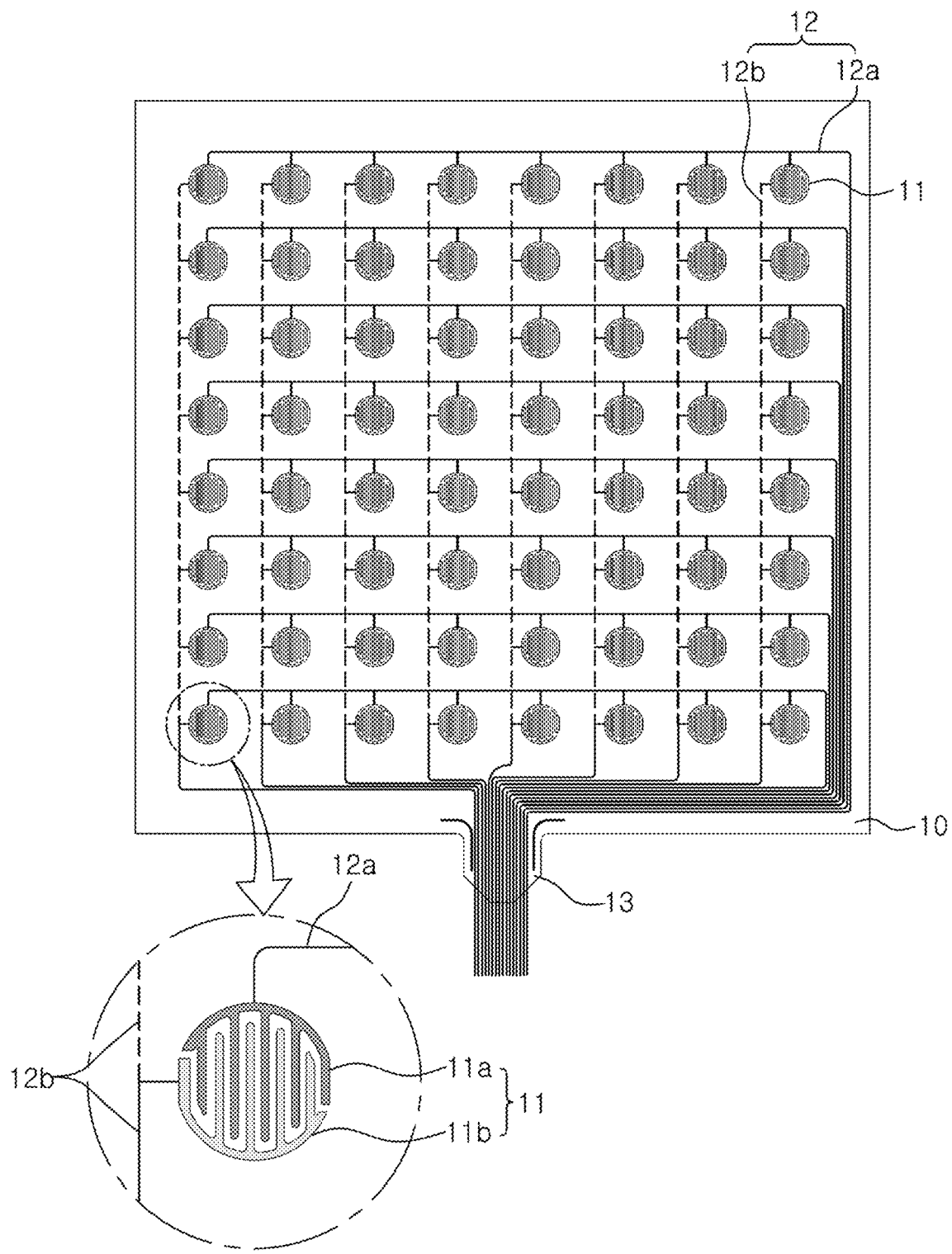
FIG. 1 is a plan view of a base substrate included in a pressure sensor module according to an exemplary embodiment of the present disclosure.

For coupling of a pressure sensor to various devices or wearable devices, necessity of a pressure sensing method using a more effective electrical method is further increasing, in addition to a physical structure flexible against external pressure and measurement of physical pressing force for more effective sensing of the physical pressure as mentioned above.

Objects, particular advantages and new features of the present disclosure will be more clearly understood from the following detailed description and preferred embodiments taken in conjunction with the accompanying drawings. In the specification, in adding reference numerals for elements in each drawing, it should be noted that like reference numerals already used to denote like elements in other drawings are used for elements wherever possible. In addition, the terms "one surface", "the other surface", "first" and "second" are used to differentiate one constituent element from the other constituent element, and these constituent elements should not be limited by these terms. In the following description, when the detailed description of the relevant known function or configuration is determined to unnecessarily obscure the subject matter of the present disclosure, such detailed description will be omitted.

Hereinafter, exemplary embodiments of the present disclosure will be described in detail with reference to the accompanying drawings. The same reference numerals in the drawings designate the same elements, respectively.

Figure 2:
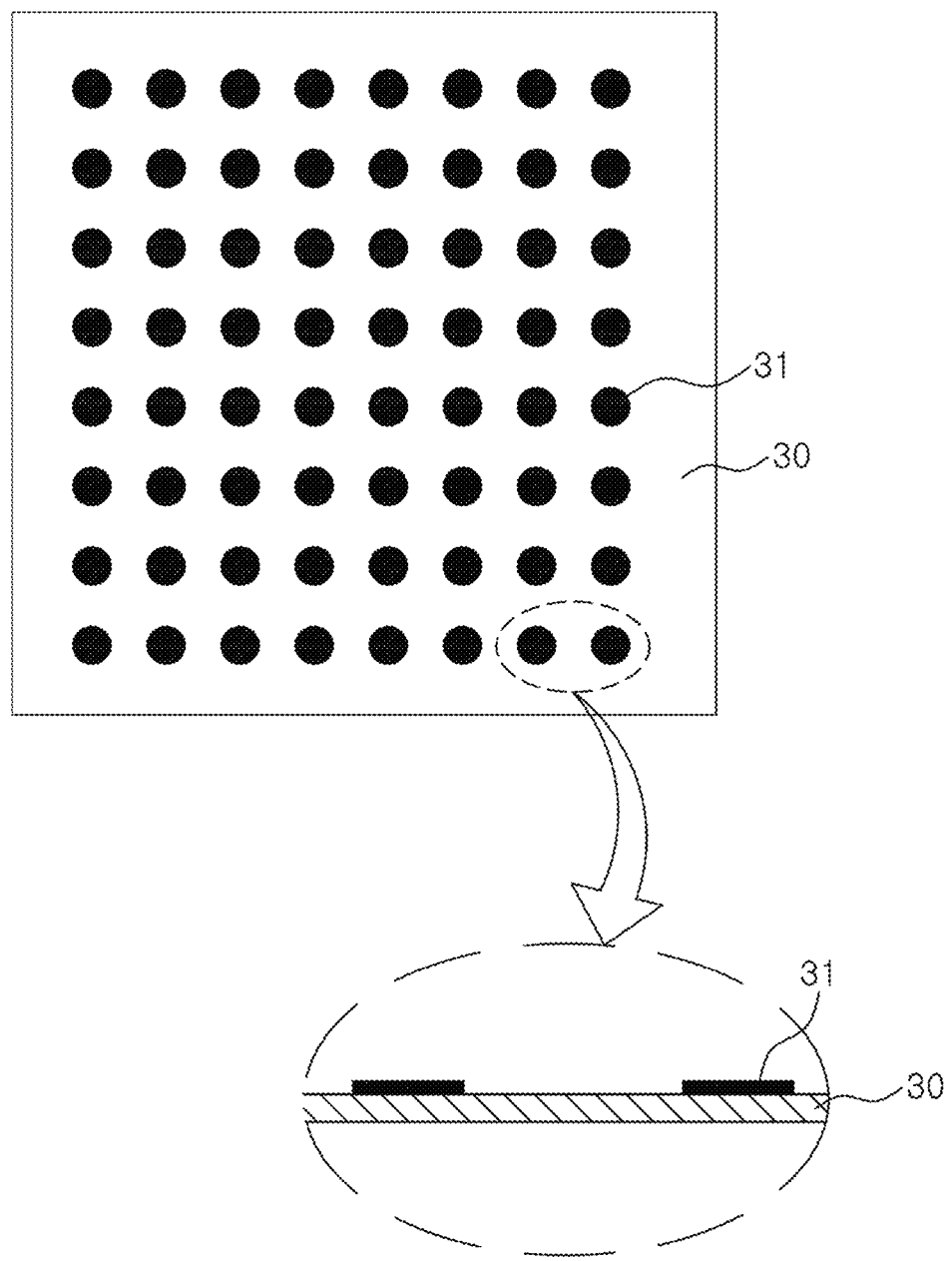
FIG. 2 is a plan view of a resistor substrate included in the pressure sensor module according to the exemplary embodiment of the present disclosure and an enlarged cross-sectional view of a part of the resistor substrate.
Figure 3:
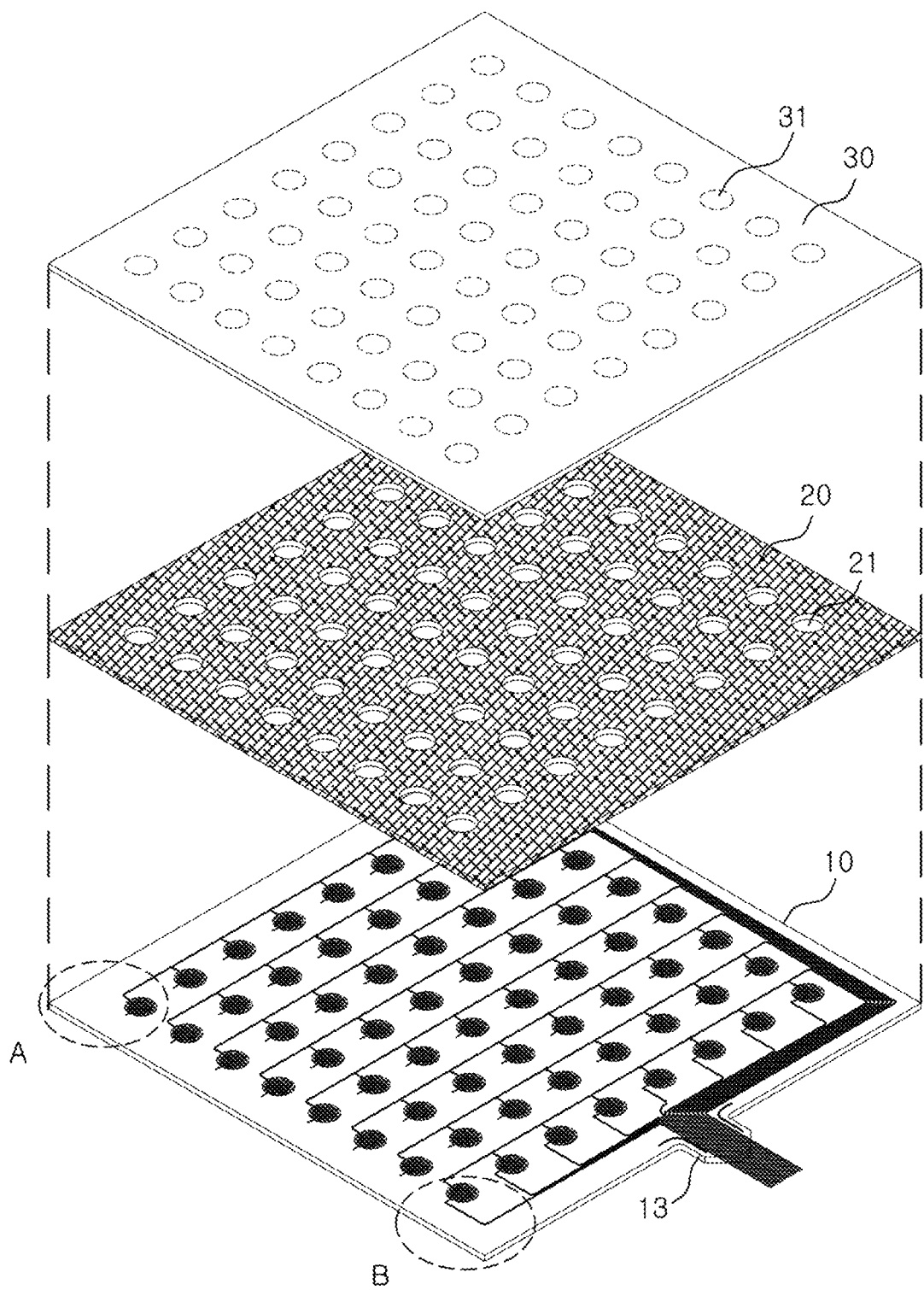
FIG. 3 is an exploded perspective view of the pressure sensor module according to the exemplary embodiment of the present disclosure.
Figure 4:
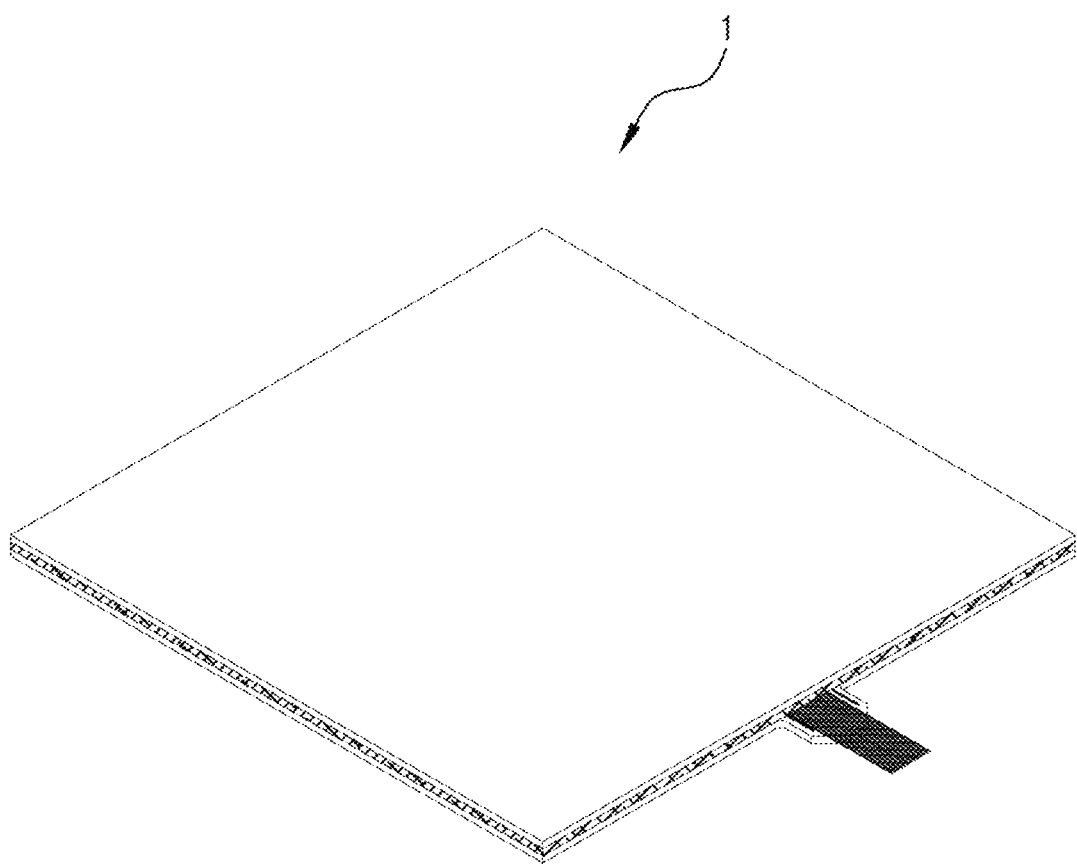
FIG. 4 is a perspective view of the pressure sensor module according to the exemplary embodiment of the present disclosure.
Figure 5:
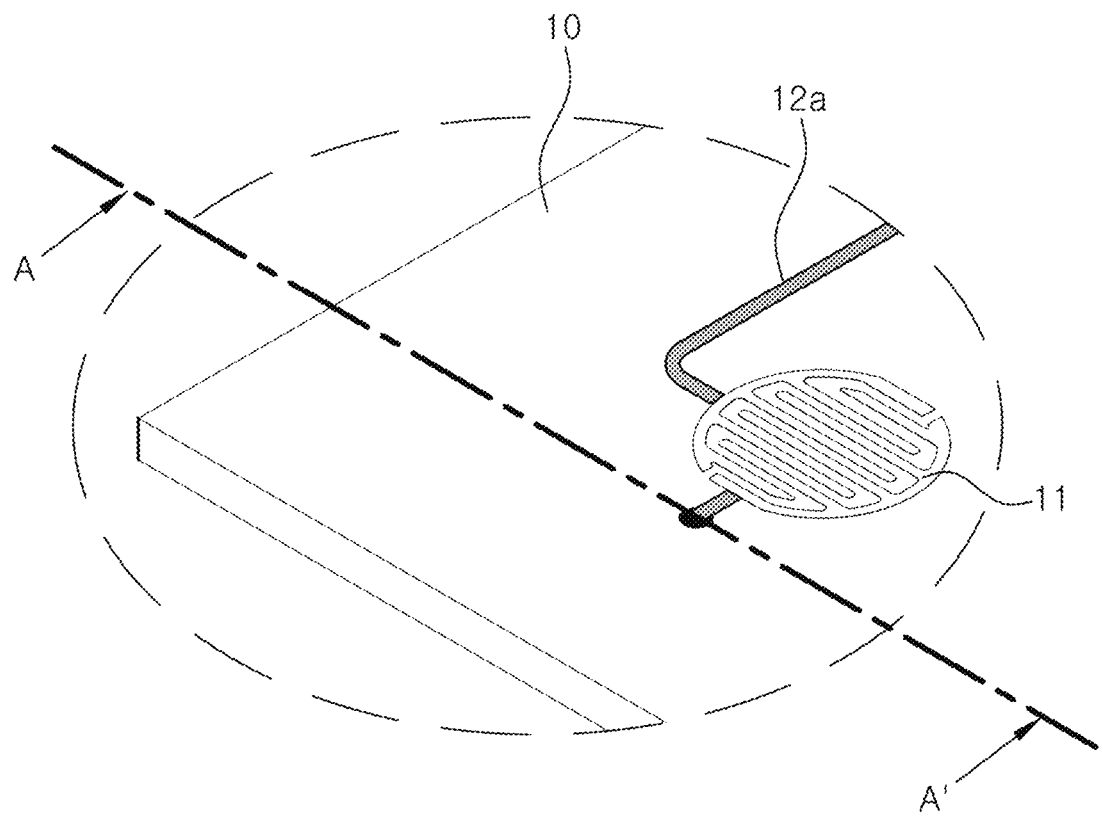
FIG. 5 is an enlarged perspective view of a region A of the pressure sensor module according to the exemplary embodiment of the present disclosure shown in FIG. 3 and a cross-sectional view taken along line A-A' in the enlarged perspective view.
Figure 5:
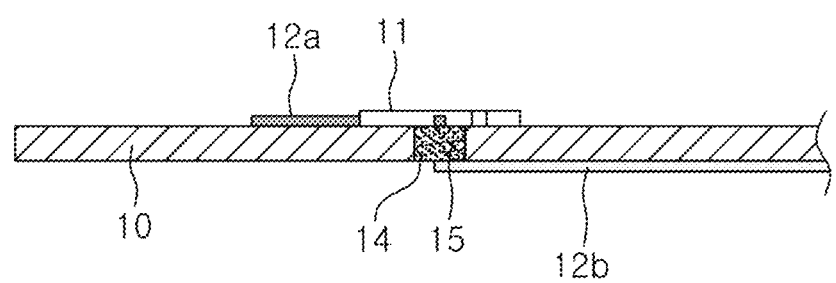
Figure 6:
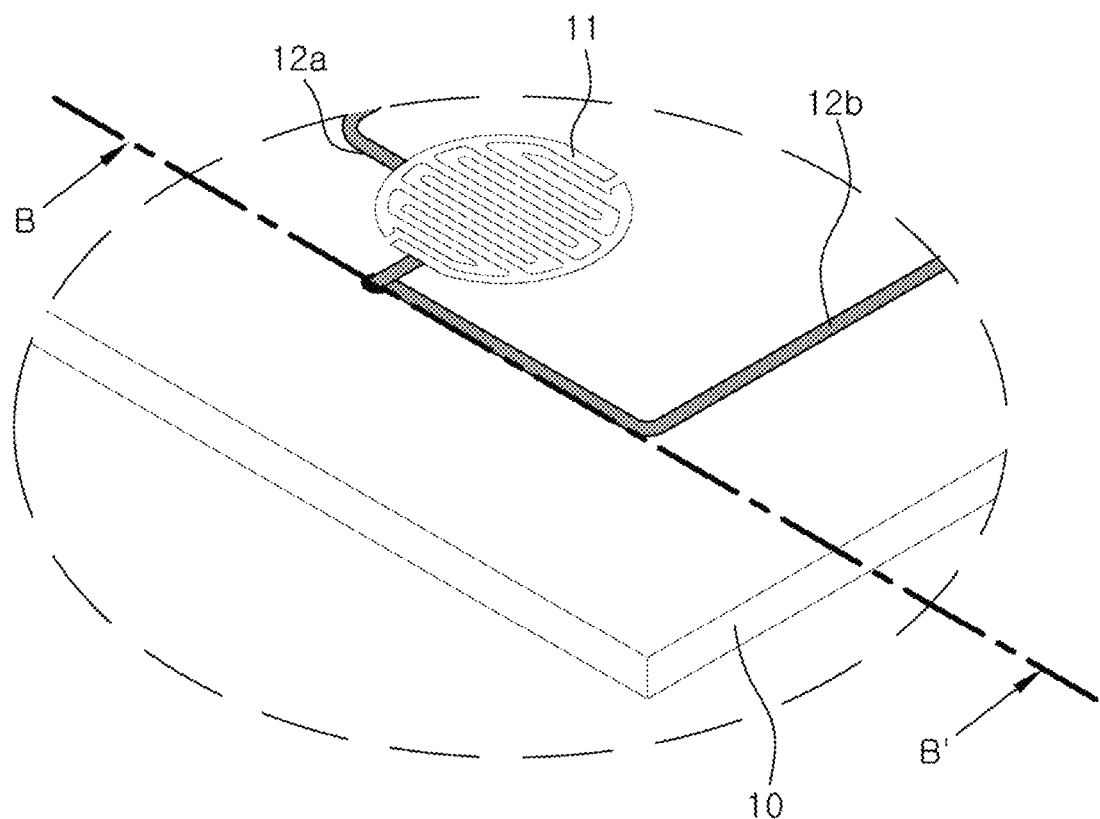
FIG. 6 is an enlarged perspective view of a region B of the pressure sensor module according to the exemplary embodiment of the present disclosure shown in FIG. 3 and a cross-sectional view taken along line B-B' in the enlarged perspective view.
Figure 6:
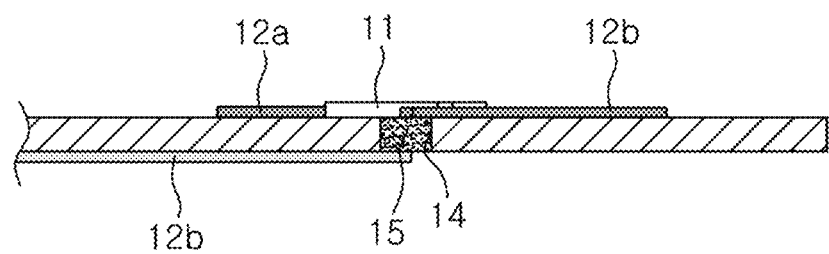
Figure 7A:
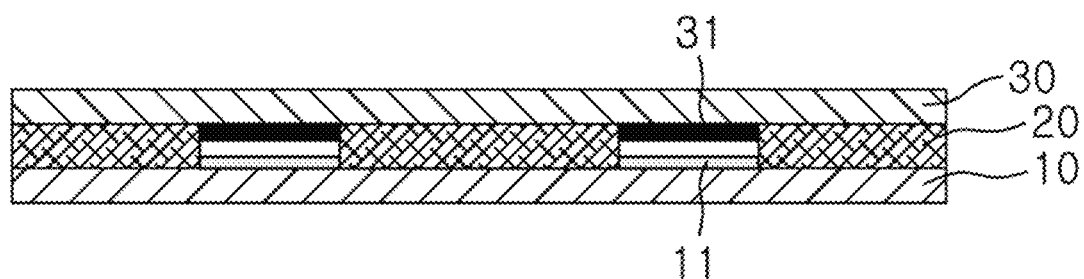
FIG. 7A and FIG. 7B are schematic views showing operation of a pressure sensor module according to an exemplary embodiment of the present disclosure.
Figure 7B:
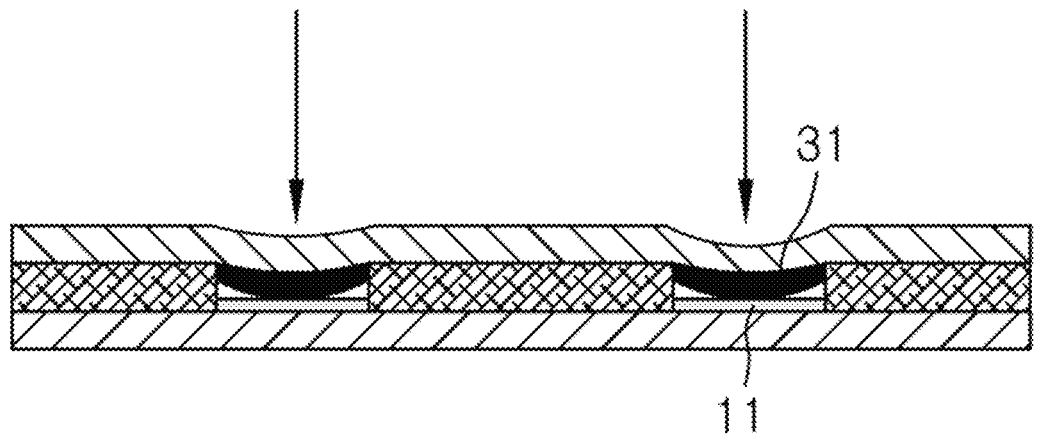
Figure 8A:
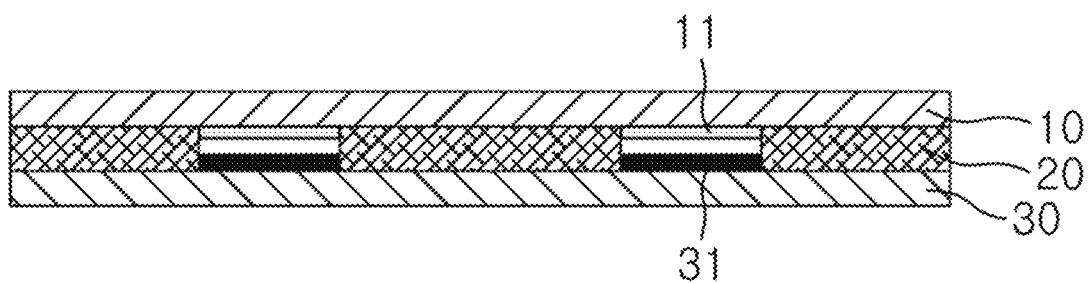
FIG. 8A and FIG. 8B are schematic views showing operation of a pressure sensor module according to a modified embodiment of the present disclosure.
Figure 8B:
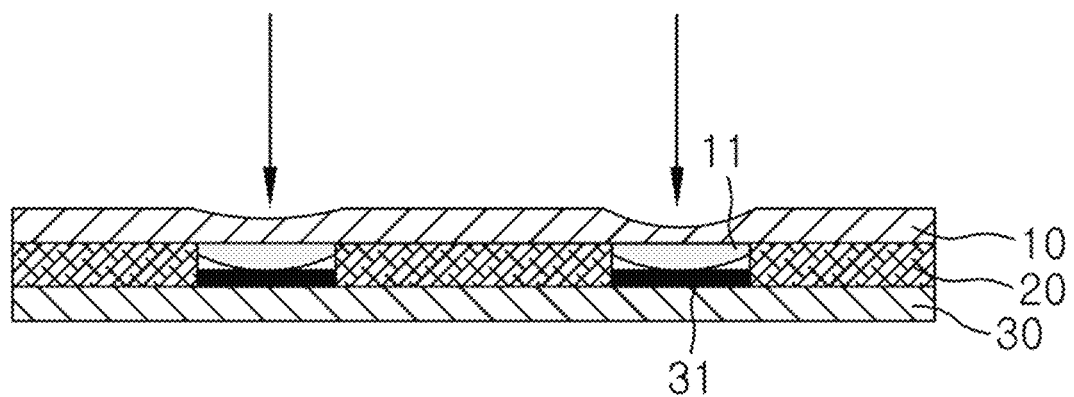

FIG. 1 is a plan view of a base substrate included in a pressure sensor module according to an exemplary embodiment of the present disclosure. FIG. 2 is a plan view of a resistor substrate included in the pressure sensor module according to the exemplary embodiment of the present disclosure and an enlarged cross-sectional view of a part of the resistor substrate. FIG. 3 is an exploded perspective view of the pressure sensor module according to the exemplary embodiment of the present disclosure. FIG. 4 is a perspective view of the pressure sensor module according to the exemplary embodiment of the present disclosure. FIG. 5 is an enlarged perspective view of a region A of the pressure sensor module according to the exemplary embodiment of the present disclosure shown in FIG. 3 and a cross-sectional view taken along line A-A' in the enlarged perspective view. FIG. 6 is an enlarged perspective view of a region B of the pressure sensor module according to the exemplary embodiment of the present disclosure shown in FIG. 3 and a cross-sectional view taken along line B-B' in the enlarged perspective view. FIG. 7A and FIG. 7B are schematic views showing operation of a pressure sensor module according to an exemplary embodiment of the present disclosure. FIG. 8A and FIG. 8B are schematic views showing operation of a pressure sensor module according to a modified embodiment of the present disclosure.

The pressure sensor module according to the exemplary embodiment of the present disclosure includes a base substrate 10, and at least one sensing electrode 11 formed at the base substrate 10. The sensing electrode 11 includes a first sensing electrode 11a and a second sensing electrode 11b spaced apart from each other, to be insulated from each other. The pressure sensor module also includes a first electrode wiring 12a electrically connected to one side of the first sensing electrode 11a and disposed at one surface of a power connector while extending on and along the base substrate 10, a second electrode wiring 12b electrically connected to one side of the second sensing electrode 11b and disposed at the surface of the power connector while extending on and along the base substrate 10, an insulating adhesive layer 20 coated on a region of the base substrate 10 other than a region of the base substrate 10 where the sensing electrode 11 is formed, and a resistor substrate 30 stacked on the base substrate 10, coupled to the base substrate 10 by the adhesive layer 20, and formed with a conductive resistor 31 at one surface thereof such that the conductive resistor 31 faces the sensing electrode 11 while being spaced apart from each other in a stacking direction.

First, as shown in FIG. 1, the sensing electrode 11 may be formed on the base substrate 10, and the electrode wiring 12 for electrical connection of the sensing electrode 11 may be formed on the base substrate 10.

The base substrate 10 is formed with the sensing electrode 11 and the electrode wiring 12 for electrical connection of the sensing electrode 11. In order to enable the base substrate 10 to flexibly move for sensing of external pressure, a flexible printed circuit board may be employed as the base substrate 10, and the base substrate 10 may also be formed using a flexible polyester film or polyimide film having the same physical characteristics as those of the flexible printed circuit board. The base substrate 10 functions as a support substrate for pressure sensing and, as such, is formed to sense pressure through the sensing electrode 11 while flexibly coping with pressure applied a plurality of times.

In association with solid-line and dotted-line portions of the electrode wiring shown in the plan view of the pressure sensor module in FIG. 1, the electrode wiring formed at an upper surface of the base substrate 10 is indicated by a solid line, and the electrode wiring formed at a lower surface of the base substrate 10 is indicated by a dotted line. Details of the electrode wirings will be described later.

The sensing electrode 11 is constituted by the first sensing electrode 11a and the second sensing electrode 11b insulated from each other. In addition, the electrode wiring is constituted by the first electrode wiring 12a electrically connected to the first sensing electrode 11a, and the second electrode wiring 12b electrically connected to the second sensing electrode 11b. Since the first sensing electrode 11a and the second sensing electrode 11b are insulated from each other, a region therebetween is in a state in which an infinite resistance is generated. Accordingly, when the resistor 31, which will be described later, is brought into contact with the first sensing electrode 11a and the second sensing electrode 11b, electricity flows between the first sensing electrode 11a and the second sensing electrode 11b. As a result, a reduction in resistance is generated. Through such resistance variation, a pressure value corresponding thereto may be sensed.

In detail, referring to FIG. 1, a plurality of sensing electrodes 11 is disposed to be spaced apart from one another, in order to insulate separate electrode structures from one another. Of course, sensing of pressure may be achieved using only one sensing electrode 11. However, when a plurality of sensing electrodes 11 is disposed, it may be possible to not only achieve pressure sensing, but also to sense a concrete position where pressure is applied, through an electrical connection structure.

The plurality of sensing electrodes 11 is disposed on the base substrate 10 while being spaced apart from one another in one direction and the other direction intersecting each other. The first sensing electrodes 11a of the sensing electrodes 11 spaced apart from one another in one direction are electrically interconnected by the first electrode wiring 12a, and the second sensing electrodes 11b of the sensing electrodes 11 spaced apart from one another in the other direction are electrically interconnected by the second electrode wiring 12b. Accordingly, the position of the sensing electrode 11 where pressure is applied may also be sensed through a difference between electrical signals of the first electrode wiring 12a and the second electrode wiring 12b.

The first electrode wiring 12a electrically interconnects the first sensing electrodes 11a formed at one surface of the base substrate 10 and spaced apart from one another in one direction, and the second electrode wiring 12b electrically interconnects the second sensing electrodes 11b spaced apart from one another in the other direction. In order to prevent electrical short circuit of the electrode wirings 12a and 12b at a point where the electrode wirings 12a and 12b intersect each other and to maximize the sensing area of the sensing electrodes 11 on the base substrate 10, the first electrode wiring 12a and the second electrode wiring 12b may be disposed at the upper surface and the lower surface of the base substrate 10, respectively, or may be appropriately disposed at the base substrate 10 and the lower surface of the base substrate 10. Accordingly, a maximum sensing density may be achieved, and electrical connection reliability may be secured.

Referring to FIG. 1, it may be seen that the sensing electrodes 11 are disposed at the upper surface of the base substrate 10, that is, one surface of the base substrate 10, the first electrode wiring 12a, which is indicated by a solid line and is electrically connected to the sensing electrodes 11, is formed at the upper surface of the base substrate 10, and the second electrode wiring 12b, which is electrically connected to the sensing electrodes 11 and extends on and along the lower surface of the base substrate 10, is disposed at the power connector.

FIG. 1 shows that, in order to form the first electrode wiring 12a and the second electrode wiring 12b on one surface of a power connector 13, which protrudes from one end of the base substrate 10, for connection to an external power source, the second electrode wiring 12b extending on and along the lower surface of the base substrate 10 is again connected to the upper surface of the base substrate 10 at the end of the base substrate 10, and then extends to the power connector 13.

Of course, the first electrode wiring 12*a* may be connected to an upper surface of the power connector 13 at the base substrate 10, and the second electrode wiring 12*b* may be connected to a lower surface of the power connector 13 at the lower surface of the base substrate 10. In FIG. 1, only one embodiment of disposition of the electrode wirings is illustrated.

FIG. 2 is a view showing formation of the resistor 31 at one surface of the resistor substrate 30. Similarly to the base substrate 10, the resistor substrate 30 is preferably formed of a material capable of flexibly transmitting pressure applied thereto. In addition, for the resistor 31, a material physically flexibly deformable by pressure applied thereto is preferably employed, even when the material is identical to or different from that of the base substrate 10.

The resistor 31 may be formed of a conductive material and, as such, may sense pressure through a variation in resistance exhibited when the resistor 31 is brought into contact with the sensing electrode 11 by external pressing force. As shown in the partial cross-sectional view of FIG. 2, the resistor 31 is formed on one surface of the resistor substrate 30. The resistor 31 may be formed through various methods such as screen printing or the like. For the resistor 31, any material may be employed without limitation, so long as the material is a conductive material capable of generating some degree of resistance. The resistor 31 is configured to be brought into contact with the sensing electrode 11 of the base substrate 10 facing the resistor 31 when external pressure is applied to the resistor 31. Accordingly, the resistor 31 is preferably formed to cover a point where the first sensing electrode 11*a* and the second sensing electrode 11*b* of the sensing electrode 11 are electrically interconnected.

As shown in FIG. 3, the adhesive layer 20 couples the base substrate 10 formed with the sensing electrode 11 and the resistor substrate 30 formed with the resistor 31 in a stacking direction. The adhesive layer 20 is formed of an insulating material, and is coated on a region of the base substrate 10 other than a region of the base substrate 10 in which the sensing electrode 11 is formed. Accordingly, the sensing electrode 11 of the base substrate 10 and the resistor 31 of the resistor substrate 30 are coupled to each other such that the sensing electrode 11 and the resistor 31 face each other in a stacking direction while being spaced apart from each other. In accordance with such a bonded structure, the sensing electrode 11 and the resistor 31 may be brought into contact with each other in a space defined therebetween by external pressure. In this case, electricity may flow between the first sensing electrode 11*a* and the second sensing electrode 11*b* of the sensing electrode 11, thereby generating a variation in resistance.

When pressing force is applied from an exterior in such a structure, as shown in FIG. 7A and FIG. 7B, the resistor substrate 30 is bent in a downward direction by the pressure. By virtue of the bending, the resistor 31 is brought into contact with the sensing electrode 11 of the base substrate 10 facing the resistor 31, thereby generating a variation in resistance. In this case, the variation in resistance, that is, the level of the pressing force corresponding to the variation in resistance, may be sensed. The higher the pressing force, the greater the contact area between the resistor 31 and the sensing electrode 11. In this case, the resistance value may be reduced in accordance with flow of electricity between the first sensing electrode 11*a* and the second sensing electrode 11*b*. It may be possible to sense actual pressure through the resistance variation as described above, based on a relationship between a predetermined pressure and a resistance.

In addition, the resistor substrate 30 and the base substrate 10 may be formed of the same material or the same kinds of materials. Accordingly, the sensing electrode 11 and the resistor 31 may be brought into contact with each other not only by pressure from an outside of the resistor substrate 30, by but also pressure from an outside of the base substrate 10. In both cases, accordingly, pressure may be sensed in the same manner. In this case, an additional protective layer (not shown) made of an insulating material may be formed for protection of the electrode wiring at the lower surface of the base substrate 10. In this case, for the protective layer, an elastic material may be employed and, as such, deformation of the base substrate 10 caused by external pressure may be flexible.

Of course, for the adhesive layer 20, an insulating material having elasticity may be employed in order to achieve more flexible contact between the resistor 31 of the resistor substrate 30 and the sensing electrode 11 of the base substrate 10 when external pressing force is applied. In this case, accordingly, the total pressure of the resistor substrate 30 may be effectively transmitted in a direction in which the resistor 31 and the sensing electrode 11 are brought into contact with each other. In addition, it may be possible to adjust and control effective pressure sensitivity in accordance with the level of the applied pressure by adjusting the facing distance between the resistor 31 of the resistor substrate 30 and the sensing electrode 11 of the base substrate 10 for sensing of the applied pressure.

FIGS. 5 and 6 are views showing a structure of a via hole 14 configured to electrically connect the second electrode wiring 12*b* to the lower surface and the upper surface of the base substrate 10 in formation of the first electrode wiring 12*a* and the second electrode wiring 12*b* in accordance with an embodiment of the present disclosure.

In the region A of FIG. 3, at the upper surface of the base substrate 10, the first electrode wiring 12*a*, which is electrically connected to the first sensing electrode 11*a* at one side of the sensing electrode 11 in one direction, and the second electrode wiring 12*b*, which is electrically connected to the second sensing electrode 11*b* at the other side of the sensing electrode 11 in the other direction intersecting the formation direction of the first electrode wiring 12*a*, are formed. In order to prevent the second electrode wiring 12*b* from physically intersecting the first electrode wiring 12*a*, the via hole 14 is formed at a position of the base substrate 10 corresponding to an intersection between the first electrode wiring 12*a* and the second electrode wiring 12*b*. A conductive filler 15 fills the via hole 14 and, as such, the second electrode wiring 12*b* may also be electrically connected to the lower surface of the base substrate 10, and may extend to the power connector 13.

FIG. 6 shows a structure in the region B of FIG. 3 in which the second electrode wiring 12*b* formed at the lower surface of the base substrate 10 is electrically connected from the lower surface of the base substrate 10 to the upper surface of the base substrate 10 so that the second electrode wiring 12*b* may be connected to the upper surface of the power connector 13 at one end of the base substrate 10. That is, in the same manner as that of the region A of FIG. 3, the second electrode wiring 12*b* extending on and along the lower surface of the base substrate 10 is formed to be electrically connected to the second sensing electrode 11*b* on the upper surface of the base substrate 10 through a via hole 14 filled with a conductive filler 15, and then to extend to the power connector 13 at one end of the upper surface of the base substrate 10.

The power connector 13 is formed to enable the first and second electrode wirings 12*a* and 12*b* to be connected to a single power supply 50 in a gathered state. Of course, a structure in which the first electrode wiring 12*a* is disposed at the upper surface of the power connector 13, and the second electrode wiring 12*b* is disposed at the lower surface of the power connector 13 so that the electrode wiring 12 on both surfaces of the power connector 13 may be connected to the power supply 50, may be employed. In this case, the second electrode wiring 12*b* formed at the lower surface of the base substrate 10 may continuously extend to and along the lower surface of the power connector 13 without changing an extension direction thereof.

Of course, the electrical connection structure to an applied device or the power supply 50 may be appropriately varied.

Figure 9:
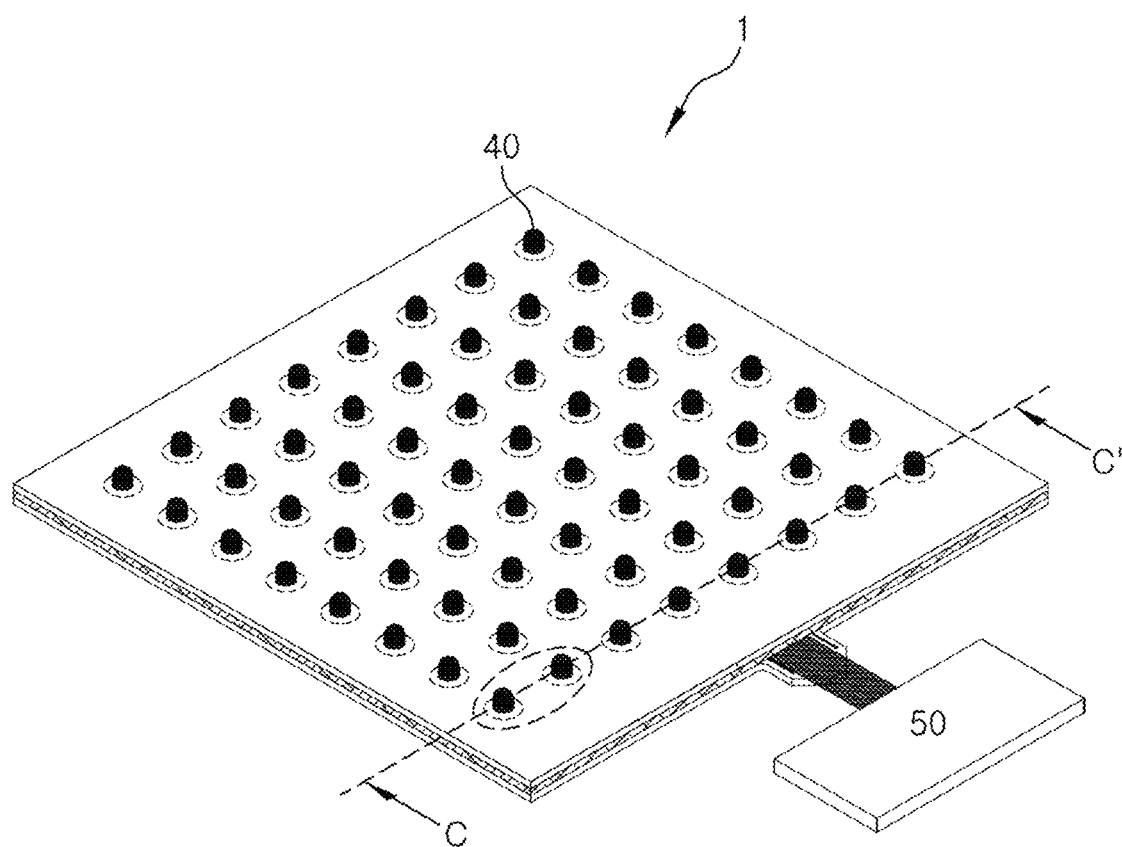
FIG. 9 is a perspective view of a pressure sensor module according to another exemplary embodiment of the present disclosure.
Figure 10:
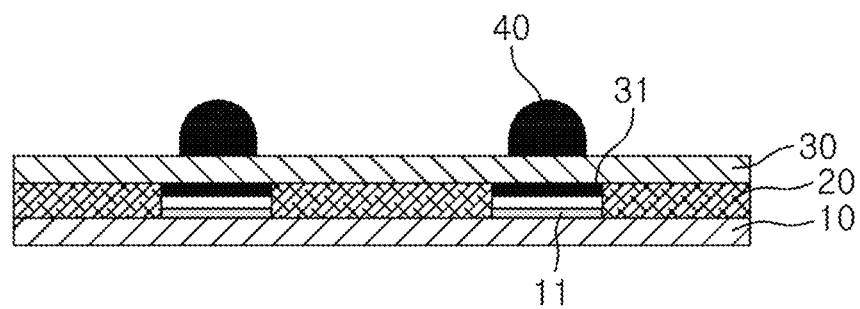
FIG. 10 is a cross-sectional view taken along line C-C' in FIG. 9.

FIG. 9 is a perspective view of a pressure sensor module according to another exemplary embodiment of the present disclosure. FIG. 10 is a cross-sectional view taken along line C-C' in FIG. 9.

FIGS. 9 and 10 show that a bump 40 is further formed on the other surface of the resistor substrate 30 opposite to the one surface of the resistor substrate 30 at which the resistor 31 is formed. In order to sense pressure caused by external pressing force, the resistor 31 of the resistor substrate 30 and the sensing electrode 11 of the base substrate 10 should be deformed to be brought into contact with each other. For this reason, it may be impossible to surely sense pressure in a region where the sensing electrode 11 is not formed.

The bump 40 is coupled to an outer surface corresponding to a point, at which the sensing electrode 11 and the resistor 31 are formed, such that the bump 40 protrudes from the outer surface. Accordingly, external pressing force may be concentrated on the protruding bump 40 and, as such, may be perfectly transmitted to the sensing electrode 11 and the resistor 31, for contact deformation of the sensing electrode 11 and the resistor 31. Accordingly, there is an advantage in that it is possible to not only more effectively sense the external pressing force, but also to more accurately sense the position of the sensing electrode 11 to which the pressing force is applied.

The bump 40 may be formed to have an upwardly protruding shape, and may be formed such that an upper surface thereof, to which pressing force is applied, forms a curved surface, for uniform distribution of pressure. Of course, the upper surface of the bump 40 may be adjusted and controlled to have an appropriate shape, taking into consideration the form of pressing force applied thereto and the area to which pressing force is applied.

Figure 11:
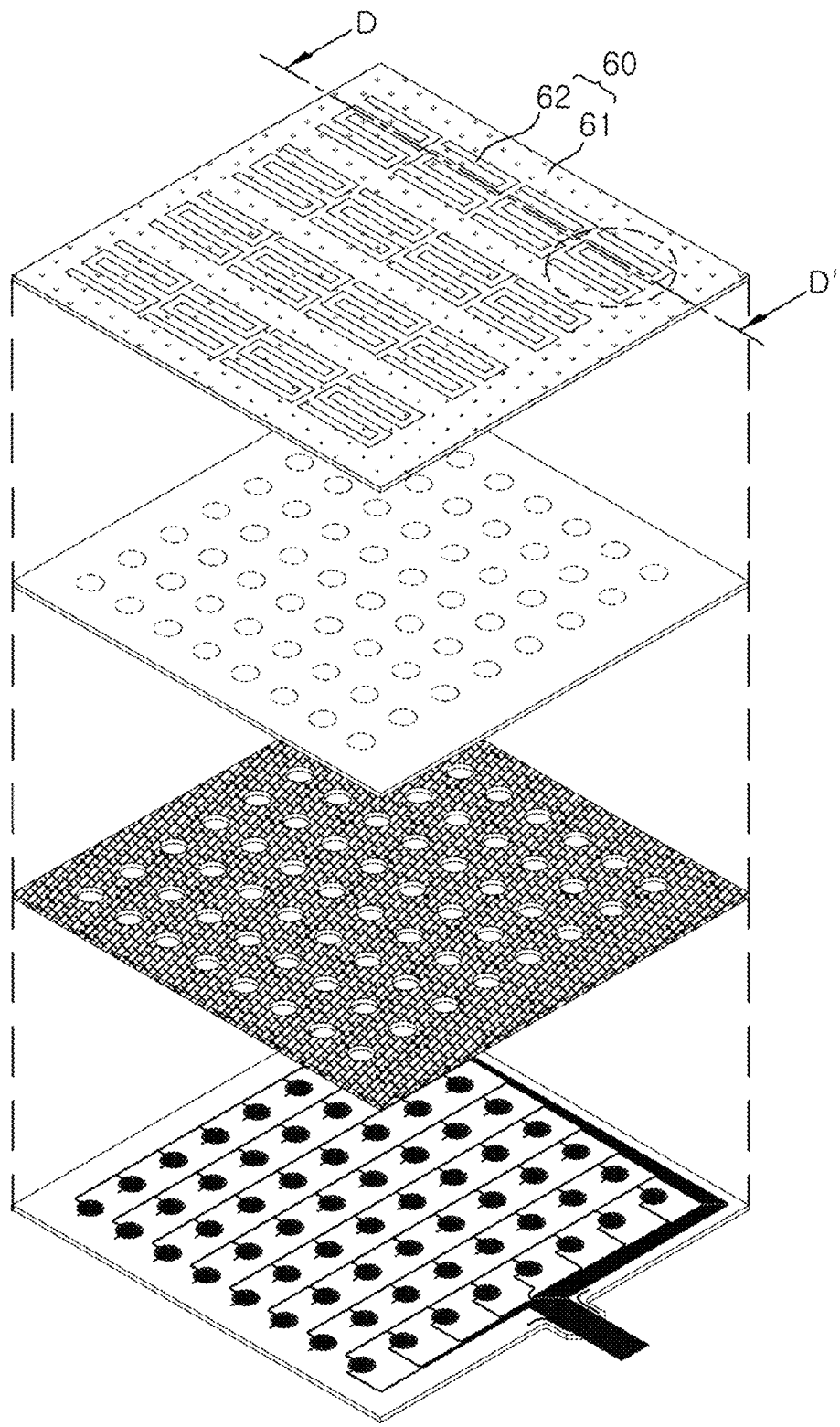
FIG. 11 is an exploded perspective view of a pressure sensor module according to another exemplary embodiment of the present disclosure.
Figure 12:
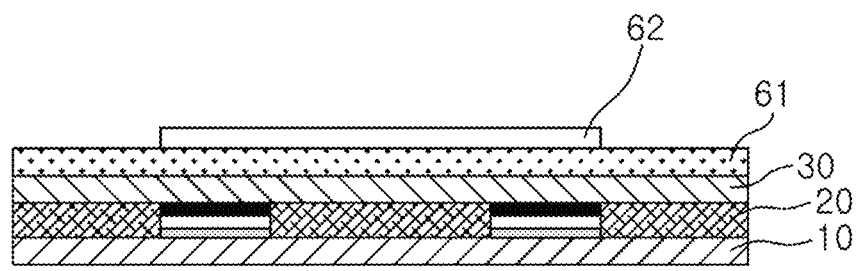
FIG. 12 is a cross-sectional view taken along line D-D' in FIG. 11.

FIG. 11 is an exploded perspective view of a pressure sensor module according to another exemplary embodiment of the present disclosure. FIG. 12 is a cross-sectional view taken along line D-D' in FIG. 11.

The pressure sensor module according to the other exemplary embodiment of the present disclosure may further include a heater 60. As shown in FIGS. 11 and 12, the pressure sensor module may further include the heater 60 which includes a substrate 61 formed on the upper surface of the resistor substrate 30 and formed with a heating pattern 62. The heater 60 may provide a heating function to the pressure sensor module through a separate power source. When the user sits on a seat of a vehicle or a seat of a chair, the pressure sensor module may recognize a use state of the user through pressure caused by seating of the user, and may then operate the heater 60. Of course, the heater 60 may operate using a separate power source, and operation of the heater 60 according to pressure sensing may be controlled through a separate controller, as in a control method which will be described later.

The heating pattern 62 may be formed in the form of a linear pattern extending to have an increased length in a given area, for an effective heating function. Of course, the heating pattern 62 is not limited to the shown structure.

Figure 13:
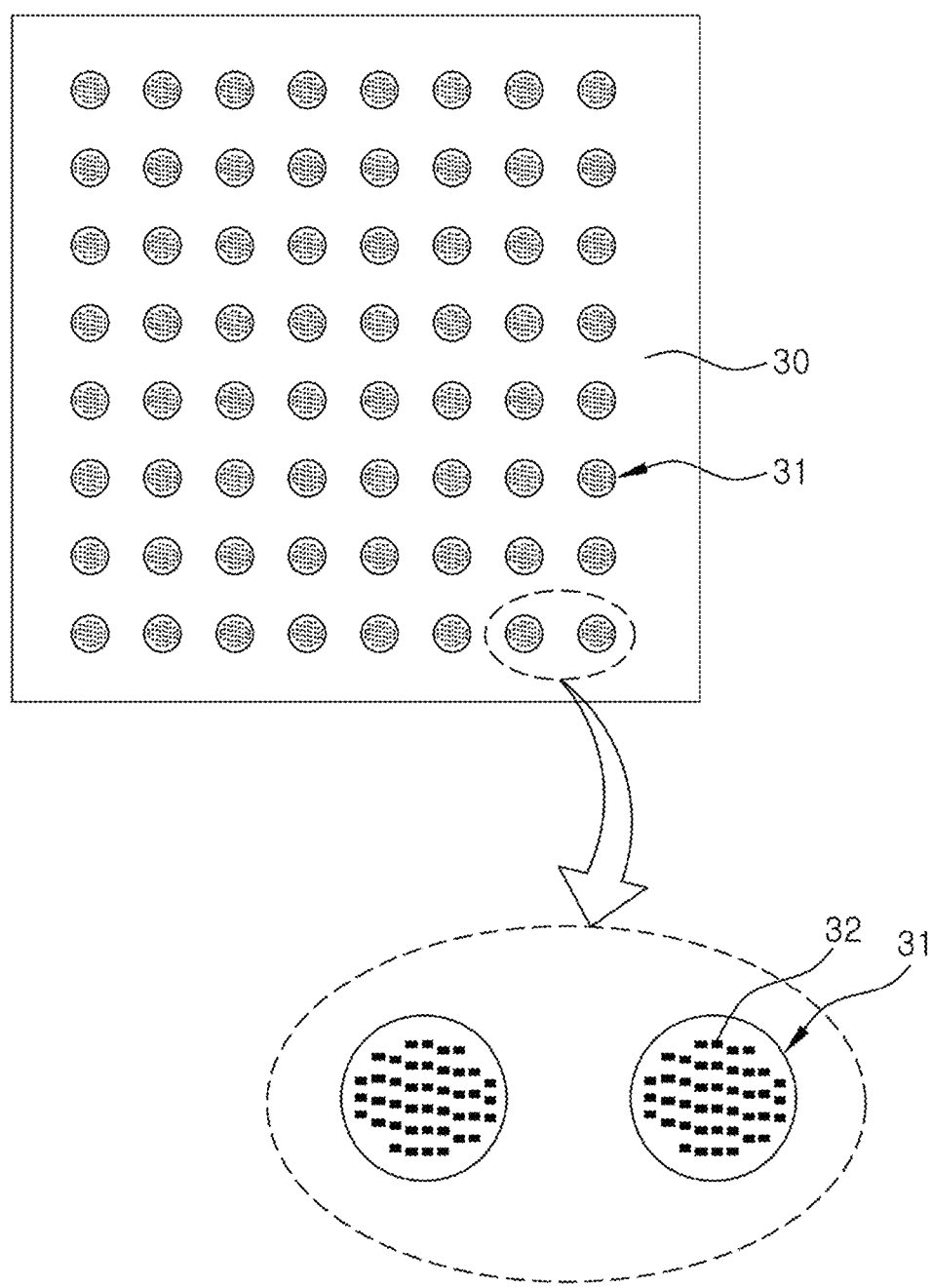
FIG. 13 is a plan view of a resistor substrate included in a pressure sensor module according to another exemplary embodiment of the present disclosure and an enlarged view of the resistor substrate.
Figure 14A:
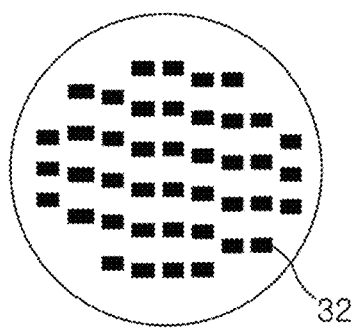
FIGS. 14A-14C are schematic views showing contact between a sensing electrode and a resistor according to the embodiment of FIG. 13.
Figure 14B:
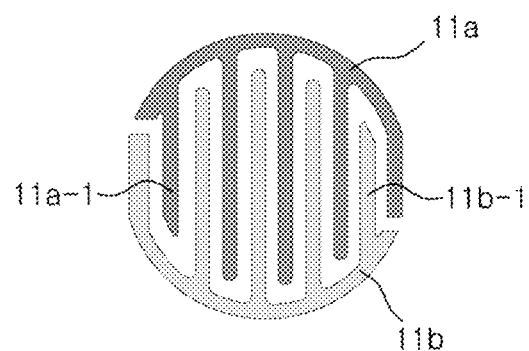
Figure 14C:
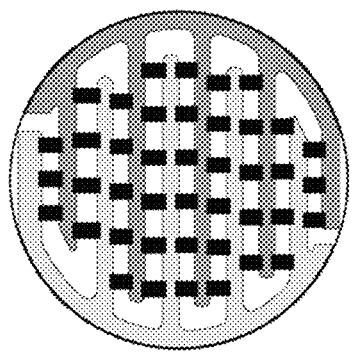

FIG. 13 is a plan view of a resistor substrate 30 included in a pressure sensor module according to another exemplary embodiment of the present disclosure and an enlarged view of the resistor substrate 30. FIGS. 14A-14C are schematic views showing contact between a sensing electrode and a resistor according to the embodiment of FIG. 13.

In the embodiment of the present disclosure, as a sensing electrode 11 of a base substrate 10 is brought into contact with a resistor 31 of the resistor substrate 30, electricity flows between the sensing electrode 11 and the resistor 31 and, as such, the sensing electrode 11 senses a variation in resistance, thereby sensing pressure. FIGS. 13 and 14A-14C show the sensing electrode 11 and a pattern of the resistor 31 configured to more stepwise sense a variation in resistance, for fine measurement of corresponding pressure levels, thereby more effectively sensing a variation in electricity flow caused by contact between the resistor 31 and the sensing electrode 11.

That is, a first sensing electrode 11*a* may include a plurality of first linear electrodes 11*a*-1 formed to protrude in one direction while being spaced apart from one another. A second sensing electrode 11*b* may face the first sensing electrode 11*a*, and may include a plurality of second linear electrodes 11*b*-1 formed to protrude in spaces among the first linear electrodes 11*a*-1 while being spaced apart from the first linear electrodes 11*a*-1, for insulation thereof from the first linear electrodes 11*a*-1, respectively. The resistor 31 may include at least one resistor pattern 32 configured to electrically interconnect gaps between the first linear electrodes 11*a*-1 and the second linear electrodes 11*b*-1, thereby electrically interconnecting the first sensing electrode 11*a* and the second sensing electrode 11*b*.

As shown in FIGS. 13 and 14A-14C, the at least one resistor pattern 32 may be formed to contact the gaps between the first linear electrodes 11*a*-1 constituting the first sensing electrode 11*a* of the sensing electrode 11 and the second linear electrodes 11*b*-1 constituting the second sensing electrode 11*b* of the sensing electrode 11, thereby interconnecting the first linear electrodes 11*a*-1 and the second linear electrodes 11*b*-1.

When a plurality of resistor patterns 32 is formed, the number of the resistor patterns 32 causing flow of electricity between the first sensing electrode 11*a* and the second sensing electrode 11*b* in accordance with contact between the resistor 31 and the sensing electrode 11 may be increased or decreased. In this case, it may be possible to sense a more concrete variation in electrical resistance and, as such, finer and stepwise pressure sensing for external pressing force may be achieved.

Referring to FIGS. 14A-14C, the resistor pattern 32 of FIG. 14A may be formed to be brought into contact with the first linear electrodes 11*a*-1 of the first sensing electrode 11*a* and the second liner electrodes 11*b*-1 of the second sensing electrode 11*b*, as shown in FIG. 14C, in order to electrically interconnect the spaces in which the first linear electrodes 11*a*-1 and the second linear electrodes 11*b*-1 are alternately disposed to be spaced apart from each other, as shown in FIG. 14B.

Figure 15:
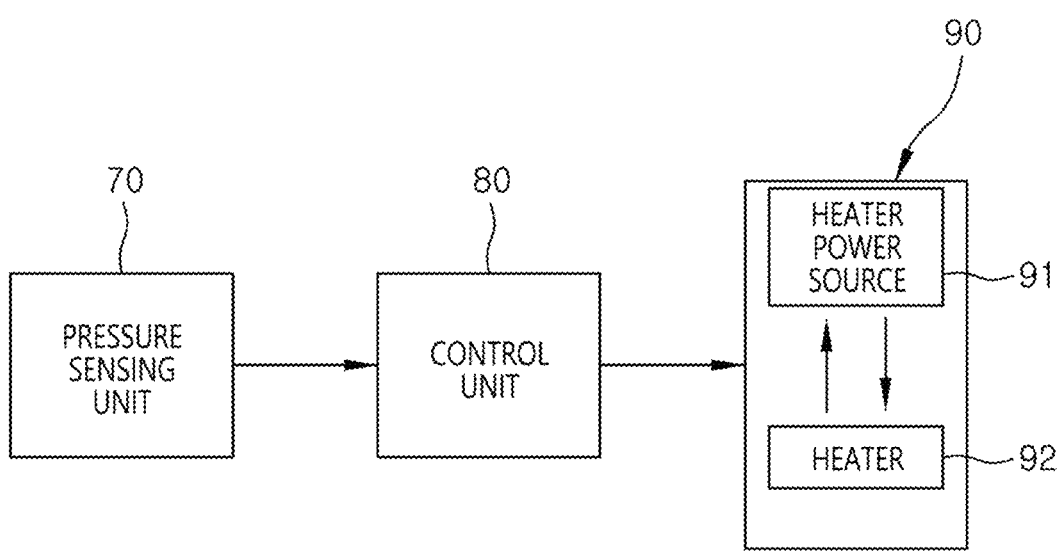
FIG. 15 is a schematic view of a control method for a pressure sensor motor according to an exemplary embodiment of the present disclosure.

FIG. 15 is a schematic view of a control method for a pressure sensor motor according to an exemplary embodiment of the present disclosure.

The pressure sensor module control method according to the exemplary embodiment of the present disclosure includes a pressure sensing unit (or a pressure sensor) 70 and configured to sense external pressure, and a control unit (or a controller) 80 configured to control operation of a heater unit 90 in accordance with the pressure sensed by the pressure sensing unit 70. The heater unit 90 includes a heater power source 91 configured to supply electric power, and a heater 92 configured to generate heat by the electric power from the heater power source 91.

The pressure sensing unit 70 includes the pressure sensor module according to the exemplary embodiment of the present disclosure and, as such, no detailed description thereof will be given because the description overlaps with the above-described content. When external pressure is sensed by the pressure sensing unit 70, the control unit 80 receives a pressure sensing signal corresponding to the sensed pressure.

In particular, in the case in which the pressure sensor module according to the exemplary embodiment of the present disclosure is applied to a chair or the like, the pressure sensor module senses pressure applied thereto when the user sits on the chair and, as such, the control unit 80 operates the heater unit 90. In addition, when the pressure sensed by the pressure sensing unit 70 approximates to zero or is gradually reduced as use of the chair by the user is completed, the control unit 80 may control the heater unit 90 to be turned off or to adjust a heating temperature of the heater 92 through the heater power source 91. Thus, an effective heater function may be achieved.

In addition, when the pressure applied by the user is continuously maintained, it may be possible to lower the heating temperature of the heater unit 90 by the control unit 80. Furthermore, when pressure is initially sensed by the pressure sensing unit 70, it may be possible to control the heater 92 to operate using a maximum output of the heater power source 91 for a predetermined time for initial operation.

Although the present disclosure has been disclosed in detail through concrete embodiments, those skilled in the art will appreciate that the pressure sensor module and the control method therefor are not limited to the embodiments, and modifications and alterations are possible, without departing from the scope and spirit of the invention. Simple modifications and alterations fall within the scope of the invention, and the protection scope of the invention will be apparent from the appended claims.

What is claimed is:

1. A pressure sensor module comprising:
   a base substrate;
   at least one sensing electrode formed at a first region of the base substrate, the at least one sensing electrode comprising a first sensing electrode and a second sensing electrode spaced apart from each other to be insulated from each other;
   a first electrode wiring electrically connected to one side of the first sensing electrode and formed at a first surface of a power connector while extending on and along the base substrate;
   a second electrode wiring electrically connected to one side of the second sensing electrode and formed at the first surface of the power connector while extending on and along the base substrate;
   an insulating adhesive layer coated on a second region of the base substrate different from the first region, and
   a resistor substrate stacked on the base substrate, coupled to the base substrate by the adhesive layer, and comprising a conductive resistor at one surface thereof such that the conductive resistor faces the at least one sensing electrode while being spaced apart from each other in a stacking direction.

2. The pressure sensor module according to claim 1, wherein:
   the at least one sensing electrode comprises a plurality of sensing electrodes spaced apart from one another in a first direction and a second direction intersecting the first direction, each of the plurality of sensing electrodes comprising the first sensing electrode and the second sensing electrode;
   the first electrode wiring electrically interconnects the first sensing electrodes of the plurality of sensing electrodes in the first direction, and extends to the power connector; and
   the second electrode wiring electrically interconnects the second sensing electrodes of the plurality of sensing electrodes in the second direction, and extends to the power connector.

3. The pressure sensor module according to claim 2, wherein:
   the first electrode wiring is connected to an upper surface of the base substrate, and extends to an upper surface of the power connector; and
   the second electrode wiring is formed at a lower surface of the base substrate while being electrically connected to the second sensing electrodes through via holes of the base substrate filled with a conductive filler, and extends to a lower surface of the power connector.

4. The pressure sensor module according to claim 2, wherein:
   the first electrode wiring extends on and along an upper surface of the base substrate, to electrically connect the first sensing electrodes to an upper surface of the power connector; and
   the second electrode wiring extends to a lower surface of the base substrate while being electrically connected to the second sensing electrodes through via holes of the base substrate filled with a conductive filler, and is electrically connected to the upper surface of the power connector through a via hole filled with a conductive filler at one end of the base substrate while extending to the upper surface of the base substrate in a state of being insulated from the first electrode wiring.

5. The pressure sensor module according to claim 2, wherein:
   the first sensing electrode and the second sensing electrode are formed to be spaced apart from each other, for insulation therebetween; and
   the resistor is formed in a space defined between the first sensing electrode and the second sensing electrode while facing the first sensing electrode and the second sensing electrode such that the resistor is selectively brought into contact with the first sensing electrode and the second sensing electrode.

6. The pressure sensor module according to claim 5, wherein:
   the first sensing electrode comprises a plurality of first linear electrodes formed to protrude in one direction while being spaced apart from one another;

the second sensing electrode faces the first sensing electrode, and comprises a plurality of second linear electrodes formed to protrude in spaces among the first linear electrodes while being spaced apart from the first linear electrodes, for insulation thereof from the first linear electrodes, respectively; and the resistor comprises at least one resistor pattern configured to electrically interconnect gaps between the first linear electrodes and the second linear electrodes, thereby electrically interconnecting the first sensing electrode and the second sensing electrode.

7. The pressure sensor module according to claim 1, further comprising:

a heater unit formed on another surface of the resistor substrate, wherein the heater unit comprises:

a substrate; and a heater pattern formed on the substrate.

8. The pressure sensor module according to claim 1, further comprising:

a bump protruding upwards and coupled to another surface of the resistor substrate opposite to a position corresponding to the resistor formed at the one surface of the resistor substrate.

9. An apparatus for controlling a pressure sensor module, the apparatus comprising:

a pressure sensor comprising the pressure sensor module of claim 1 and configured to sense external pressure; and a controller configured to control operation of a heater unit in accordance with the external pressure sensed by the pressure sensor, wherein the heater unit comprises:

a heater power source configured to supply electric power; and a heater configured to generate heat by the electric power from the heater power source.

10. A method of controlling a pressure sensor module, the method comprising:

sensing, by a pressure sensing unit, external pressure, the pressure sensing unit comprising the pressure sensor module of claim 1; and controlling, by a controller, an operation of a heater unit in accordance with the external pressure sensed by the pressure sensing unit, wherein the heater unit comprises:

a heater power source configured to supply electric power; and a heater configured to generate heat by the electric power from the heater power source.

* * * * *